Nov. 8, 1966     I. HALASZ ETAL     3,283,483
PACKED COLUMNS FOR CHROMATOGRAPHY
Filed March 11, 1965     2 Sheets-Sheet 1
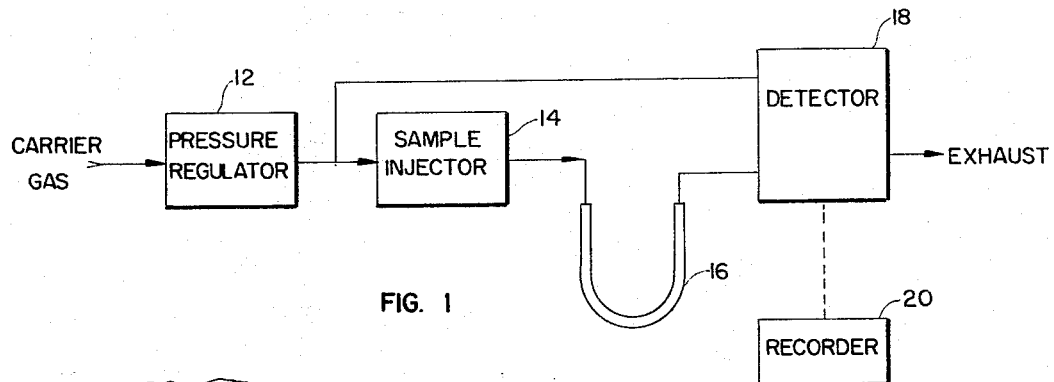
FIG. 1
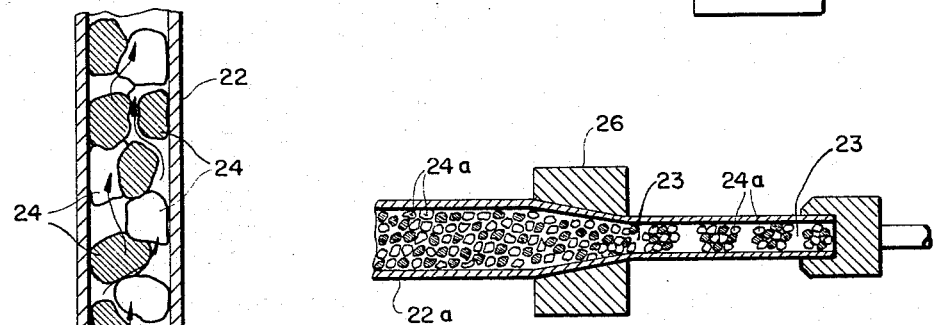
FIG. 2     FIG. 4
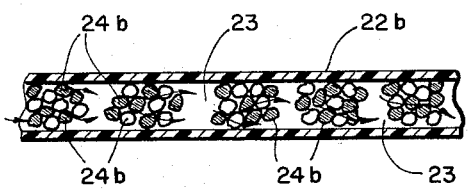
FIG. 5
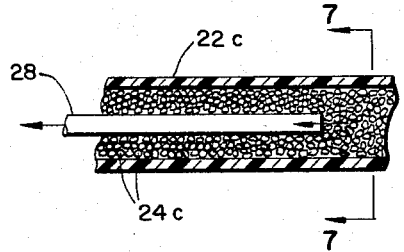     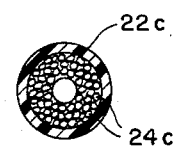
FIG. 6     FIG. 7
INVENTORS
ISTVAN HALÁSZ
BY ERWIN HEINE
ATTORNEY United States Patent Office 3,283,483
Patented Nov. 8, 1966

3,283,483
PACKED COLUMNS FOR CHROMATOGRAPHY
Istvan Halasz, Frankfurt am Main, Germany, and Erwin Heine, Riverside, Calif., assignors to Beckman Instruments, Inc., a corporation of California
Filed Mar. 11, 1965, Ser. No. 439,008
Claims priority, application Germany, May 4, 1962, H 45,689; Mar. 19, 1964, H 52,097
9 Claims. (Cl. 55—386)

The present invention relates to separation columns for use in chromatographic analysis apparatus and more particularly to column packing structure adapted to promote high-speed separation of the components of a fluid sample and to the method of making such columns.

This application is a continuation-in-part of our now abandoned copending application entitled "Packed Columns for Gas Chromatography," filed April 23, 1963, Serial No. 275,134 and assigned to the assignee of the present invention.

In chromatographic analysis, a small sample in the form of a gas or liquid mixture is introduced into a suitable fluid carrier stream and carried by the stream through a separation column. The separation column is normally a tubular conduit packed with a material for which each of the respective components of the sample mixture has its own unique "affinity" or retention time. The difference in the "affinity" or retention time of the respective components of the mixture causes the different components of the sample to stay within the column for different lengths of time. Therefore, the components of the mixture emerge from the column at different times. The affinity of most liquid and gaseous compounds for various packing materials is well known and the order of emergence of the individual components of a sample mixture can be easily ascertained.

As each component emerges from the column, it is passed through a detector device which measures a physical or electrical property of the respective component against a reference property of the carrier fluid. The output of the detector is representative of the percentage or quantity of the particular component within the sample. A recording of the output of the detector for a particular liquid or gaseous sample results in a multi-peaked curve, wherein each peak may represent one component of the sample. The quantity of each of the components is represented by the area under its respective portion of the curve and may be calculated by integration or, in some cases, may be estimated from the peak height.

The material causing the separation of the respective liquid or gaseous components of a sample is commonly called the "stationary phase" of the column. Separation is obtained either because the stationary phase has adsorbing surfaces or because the surface has been coated with a thin film of partitioning liquid, having a high boiling point and for which the liquid or gaseous constituents of the sample have an "affinity."

Typical packed columns presently in use in gas chromatography analysis apparatus have an inner diameter of about 1.5–6 mm. and are packed with particles having extremely small size. It was believed necessary in the past, in order to obtain good separation or resolution with a minimum amount of "spreading" of the sample during flow through the column, to fill the column as homogeneously and as densely as possible by such measures as vibrating and knocking the column. This was done to make the flow of the sample through the column follow a uniform frontal displacement pattern along the length of the column. A great amount of data has been published in the gas chromatography field tending to show that peak spreading expressed in terms of height equivalent to a theoretical plate (plate height or H.E.T.P.), increases essentially linearly with increasing particle diameter as used with the columns normally employed. It has also been stated and believed that adverse effects result from the non-uniformity of packing which occurs when particles of diameter greater than $\frac{1}{10}$ to $\frac{1}{8}$ the inside diameter of the column are used. It has thus been the universal belief that the particles or grains of packing material shoud be of uniform dimensions and extremely small in size. Thus, prior art or classical chromatographic columns, employed in both liquid or gas chromatography, have always been packed with particles of a size less than $\frac{1}{10}$ of the tube inside diameter and usually of a magnitude very much smaller in order to promote as dense a packing as possible and thereby prevent cross-sectional variations in the flow velocity of the sample as it traverses the length of the column.

Such columns have a high resistance to flow and columns having sufficient length to perform difficult separations require extremely high inlet pressures. Thus, the speed of analysis with such columns is limited by the high pressure required to obtain high linear gas velocity. Even with relatively short, densely packed columns, high inlet pressure is necessary to obtain reasonable speeds of analysis. However, the amount of pressure that may be used to attain greater speed of analysis has its limitations. A practical upper limit on the pressure permissible at the column inlet is set by the requirement for introducing samples at this point through a hermetically sealed injection means.

In the past, the use of packed columns having diameters smaller than about 1.5 mm. has proved impractical because of the excessive pressure drop occurring when such a column is densely packed with particles in the size range considered necessary. For this reason, and additionally because of the great difficulty encountered in uniformly packing small diameter columns, it was heretofore believed that the lower limit for diameters of packed chromatograph columns was about 1.5 mm.

Columns having smaller diameters than 1.5 mm. have been used in gas chromatographic analysis but these have not been columns packed with a particulate type separation material. Rather, these columns are of open-tubular type, and have the inner surface thereof coated with a separating liquid phase. The above-described open-tubular column is disclosed in United States Patent No. 2,920,478 which issued to M. J. E. Golay on January 12, 1960. While the open-tubular column is useful for some purposes and does increase the speed of analysis in those applications to which it may be applied, it does have its limitations. Only the liquid phase or partitioning liquid of the column acts in the separation and such columns are very limited in the amount of liquid phase which they can contain. This limits the usefulness of such columns to extremely small sample sizes and to components having strong affinity for the liquid phase employed. For example, open-tubular columns have found application in the gas chromatograph analysis of mixtures of high boiling point hydrocarbons although such columns are impractical for separation of mixtures of the lighter hydrocarbon gases such as methane, ethane, propane and butane. It has been suggested that the sample capacity of open-tubular columns and their usefulness for less strongly retained components may be improved by making the inner surface thereof rough or by coating the inner surface with a very finely granulated powder.

While it is true that the relative size and uniformity of the particles or grains of packing material probably do have a direct relationship to the amount of "spreading" that occurs in a gas sample during flow through a column packed with particles that are extremely small in dimension, applicants have discovered that this relationship does not apply, or is completely abated by other factors, when the dimensions of the particles or grains is made relatively large in comparison to the diameter of the tube. It has been found that the spreading effect is reduced by an appreciable amount when the minimum cross-sectional dimension of the packing particles or grains is greater than 1/5 of the inner diameter of the column. Using this approach, packed columns of relatively low pressure drop can be constructed having greatly increased speed of operation with minimum decrease in resolution due to the spreading effect of the column on the sample components.

Accordingly, it is an object of the present invention to provide a new and improved chromatographic column having a packing structure adapted to greatly increase the speed of separation within the column with minimum loss of resolution due to spreading within the column.

Another object of the present invention is to provide an improved packed chromatograph column having an extremely high permeability (and consequent low pressure drop) and correspondingly high speed of separation for a particular resolution as compared to known types of packed columns presently used in the field.

A further object of the present invention is to provide a method of making extremely small diameter (less than 1 mm.) packed chromatograph columns.

Further objects and advantages of the invention will become apparent as the following description proceeds, and the features of novelty which characterize the invention will be pointed out with particularity in the claims annexed to and forming a part of this specification.

Briefly, the present invention comprises a separation column packed with a solid particulate or granular material, with the grains of packing material having a cross-sectional dimension greater than 1/5 of the inner diameter of the column. In a preferred embodiment of the invention, the inner diameter of the column is less than 1 mm. and, in contrast to the traditional packing concepts, the granular packing particles are of a dimension sufficiently large to assure that the inter-particle void space within the column is at least 45 percent of the total volume of the column that is packed. Within the specified range of ratio of particle diameter to column diameter, such inter-particle void volume rises naturally as the particles pack into the column in contact with and supporting one another.

Another aspect of the present invention is a method for constructing small diameter packed chromatographic columns incorporating the steps of packing a small diameter column with a particulate or granular packing material having a dimension greater than 1/5 of the inner diameter of the column ultimately to be formed, and supporting the particles during the packing thereof to provide an inter-particle void within the packed portion of the column that is at least 45 percent of the total volume of the packed portion of the column and then drawing the column down to the desired diameter of 2 mm. or less.

For a better understanding of the invention, reference may be had to the accompanying drawings in which:

FIG. 1 is a schematic diagram of a chromatograph system embodying the separation column of the present invention;

FIG. 2 is a longitudinal cross-sectional view of a chromatograph column of the present invention illustrating the relatively great size of the particulate packing material in comparison to the column diameter;

FIG. 4 is a schematic cross-sectional view illustrating the process of drawing down a packed tube through a die;

FIG. 5 is a greatly magnified illustration of a packed glass tube which has been drawn down to a diameter of less than 1 mm.;

FIG. 6 is a schematic cross-sectional view showing a tubular conduit packed around a rod inserted in the conduit in accordance with one embodiment of the invention;

FIG. 7 is a cross-sectional view of the column of FIG. 6 taken along line 7—7.

Figure 8:
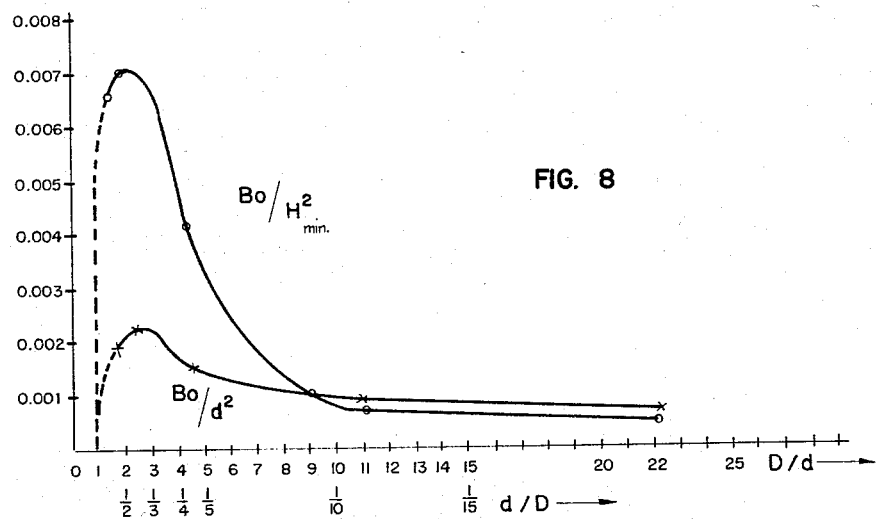
FIG. 8 is a curve plotted from test data illustrating one measure of column performance plotted against the tube diameter to particle diameter ratio.

Referring now to the drawings, FIG. 1, represents a typical arrangement for a gas chromatograph system including a pressure regulator or flow controller 12, a sample injector 14, a chromatograph column 16, a detector 18 and a recorder 20. The flow of carrier gas, ordinarily helium, although other gases such as argon, nitrogen, carbon dioxide, hydrogen and even air may be used, is controlled by the pressure regulator 12. At a particular time a quantity of sample is injected into the carrier gas by means of the sample injector 14 and components of the sample are separated as the sample moves through the column 16. The detector 18 provides an output indicating the presence of a sample component in the column effluent. As pointed out previously, the output of the detector may be used as a quantitative measure of the components of the sample. In actual practice, the output of the detector is ordinarily recorded in some form for subsequent review, although the output may merely be indicated for contemporaneous visual inspection.

While the apparatus of FIG. 1 is a typical gas chromatograph analysis system, it will be understood that the chromatograph column structure of the present invention is adapted for use in liquid chromatograph systems as well as for use in gas chromatograph systems. In a liquid chromatograph system, a carrier solution of liquid, such as a solution of ethyl alcohol, or a solution of pyridine, butanol and water, is pumped through the system under pressure in place of the carrier gas stream. In a liquid chromatograph system, the sample is injected into the liquid carrier stream by means of a sample injector corresponding to the sample injector 14 of FIG. 1 that preferably injects the sample mixture in liquid form. The sample mixture is then carried by the liquid carrier solution through the chromatograph column for separation into its various components. The only major difference in a liquid chromatograph system over a gas chromatograph system is in the use of a suitable liquid pumping means (not shown) for maintaining flow of the liquid carrier stream at the desired pressure and flow rates.

Figure 3:
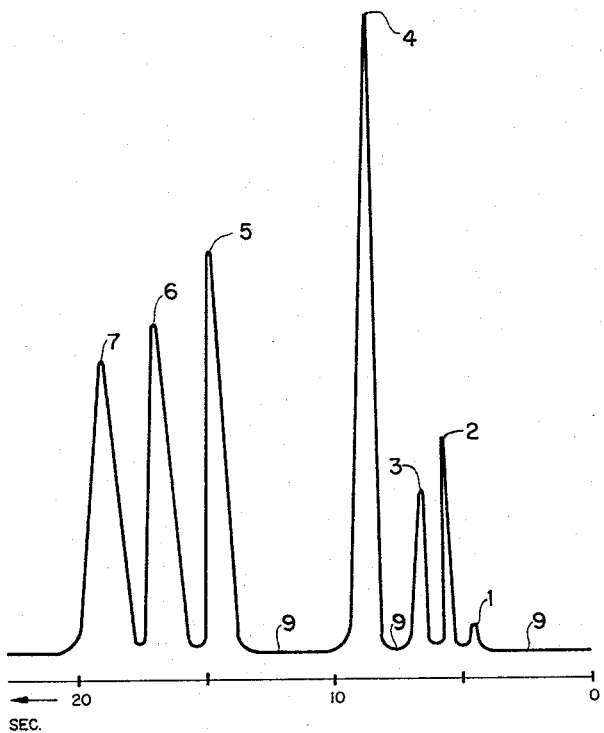
FIG. 3 illustrates a chromatograph of a gas mixture containing a number of hydrocarbons that was made with a chromatograph column of the present invention in 20 seconds.

In both a gas chromatograph system and a liquid chromatograph system the output of the detector appears as a multi-peaked curve, such as that shown in FIG. 3, in which each peak represents one of the separated components of the sample. The proportionate quantity of the respective component represented by a single peak is calculated from the area beneath the respective portions of the peak or may be estimated from the height of the peak. This latter method, i.e., estimating from peak height, is a desirable method of analysis and is preferable where the analysis must be performed very quickly and on a very extensive or frequently repetitive basis as in chemical process control. It will be understood that this method is only accurate where the peak heights are representative of the proportionate quantities of the individual components of the sample mixture. When the peaks so formed are sufficiently sharp and narrow to permit essentially complete resolution or separation of the individual sample components, then peak heights are usually fairly representative of the proportionate quantity of the particular components present. However, when the sample spreads as it flows through the column 16, the respective components of the sample do not emerge from the column as narrow bands of the particular separated component, but tend to spread and emerge from the column in relatively wide bands which may overlap for successive components. This results in a curve or output from the detector in which the representative portions of the curve are not sharply distinguished peaks but are smooth, relatively wide curves in which an individual peak height cannot be considered, on a uniform basis, as being representative of the particular quantity of a single component in the sample. Thus, it is desirable to prevent spreading as much as possible in order to obtain good resolution or separation of the particular components of the sample. This requires a column which produces as little spreading as possible, yet contains sufficient partitioning agent to provide separation of the components from one another.

Referring now to FIG. 2, there is shown a greatly enlarged view of the chromatographic column 16 which is designed to obtain good resolution or separation of the components of a sample in an extremely short time with a minimum of spreading of the fluid sample as it flows through the column. The column 16 comprises a tubular conduit 22 which is filled or packed with numerous particles 24 made from aluminum oxide or other well-known packing material. In the embodiment shown in FIG. 2, the particles are granular in character and have a major dimension that is about 1/3 to 2/3 of the inner diameter of the tube 22. The size of the particles and their number is such that they comprise not more than 55 percent of the inner volume of the packed portion of the tube.

A separating column having such large particles or grains in comparison to the tube diameter provides, contrary to established belief in the field, excellent separating powers especially for sample mixtures having a low boiling point. The column can be operated with a considerably lower carrier pressure to obtain extremely high linear speed of the carrier stream as compared to traditional columns having densely packed particles of extremely small size. In contrast to known narrow capillary columns, the inner surface of which is wetted by a liquid, the passage of the fluid through the column 22 of the present invention takes place in such a fashion that the velocity distribution is not the same everywhere because the fluid has to stream around the irregularly arranged and irregularly formed particles of the filling.

Because of the large particle size there is, in effect, a series of open regions connected by narrow passages around the particles. This creates increased velocity flow through the respective connecting passages between the particles, as illustrated by the arrows in FIG. 2, but results in a reduced flow velocity in the open regions between the particles. It is believed that this type of flow has the effect of continually mixing the fluids along a relatively narrow front and increases the separation power of the column. The mixing effect in the rather large open regions between the particles seems to overcome any tendency for the fluid sample to spread due to increased velocity flow through one portion of the tube over that of another.

By using a method to be hereinafter described, a small diameter column was packed with particles ranging from 1/3 to 1/2 of the diameter of the column. This column had a length of 2 meters and an inner diameter of 1/4 mm. In order to demonstrate the ability of such a column as employed in a gas chromatograph system, there is shown, in FIG. 3, a chromatogram illustrating the separation of a number of hydrocarbons in a gas mixture. This separation took place in 20 seconds. Peak 1 corresponds to methane, peak 2 to ethane and peak 3 to ethylene. Peaks 4, 5, 6 and 7 correspond respectively to propane, propylene, isobutane and the normal butane. The chromatogram was made with the column maintained at a temperature of 90° C. Hydrogen was used as the carrier gas and the pressure of the gas at the column entry was 3 atmospheres. Note that this column separated the components so completely as to result in base line resolution for each component. That is, each peak was sufficiently separated from the next so that the recording instrument approached the base line 9 before another component began to pass through the detector and to affect the movement of the recorder. With such a resolution of components the peak heights provide an accurate representation of the percentage of the respective components within the sample at constant operating conditions.

It is found that a column packed in accordance with traditional concepts, having a much larger diameter and using small particles, i.e., particles much less than 1/5 of the inner diameter of the column, and having a length of 2 meters, provides much more resistance to fluid flow and greatly reduced the linear speed of the carrier gas during a similar chromatographic analysis at a pressure of 3 atmospheres. A chromatogram, similar to that of FIG. 3, made with a classical type column in a gas chromatograph system would take from 3 to 4 minutes at a pressure of 3 atmospheres. Thus, a column having the particle-to-tube size ratio of the present invention, when used in a gas chromatograph system, is from 8 to 10 times faster than the conventional gas chromatograph column at the same pressures with equally good resolution.

It has been found that a departure from the normally accepted practice of using particles smaller than 1/10 of the diameter of the tube to a use of particles 1/5 or more of the diameter of the tube produces a dramatic and unexpected benefit in the form of high column efficiency at low pressure drop (high permeability).

As applied to gas chromatograph columns, the effect is most clearly seen in the graph shown in FIG. 8. Here the dimensionless quantities $B_0/H^2_{min}$ and $B_0/d^2$ are shown as functions of the tube-to-particle diameter ratio, $D/d$, where D is the diameter of the column and $d$ is the diameter of the packing particles. $B_0$, the specific permeability coefficient, is inversely proportional to the pressure drop required per unit length of column per unit of linear velocity. $H_{min}$ is the maximum height equivalent to a theoretical plate (at the optimum linear gas velocity) and is the ratio of the column length to the optimum number of theoretical plates obtained. The dimensionless quantity $B_0/H^2_{min}$ is thus proportional to the theoretical plate number, squared, per unit of pressure drop and per unit length of column; hence $B_0/H^2_{min}$ is proportional to the product of the number of plates per unit length and the number of plates per unit of pressure drop at fixed linear gas velocity (columns of different diameter are appropriately compared at fixed linear velocity rather than fixed volume flow rate, since both the relative plate efficiency and the analysis time tend to be comparable for different columns operated at fixed linear velocity). Since the largest possible number of plates is desired at the lowest possible pressure drop and for the shortest possible column, $B_0/H^2_{min}$ is clearly a figure of merit for column performance.

The dimensionless function $B_0/d^2$ is a specific permeability which has been corrected for the direct influence of particle size and thus measures only those changes in the permeability resulting from increasing porosity as $D/d$ is decreased. The observed form of this function was as expected from the known Kozeny-Carman equation. However, the significant departure of the curve for $B_0/H^2_{min}$ from the curve for $B_0/d^2$ in the range of $D/d$ below approximately 5:1 is unexpected and completely contrary to prior art thinking.

The figure of merit $B_0/H^2_{min}$ is seen to be strikingly high for values of $D/d$ below about 5 (i.e., for particles greater than about 1/5 of the column diameter). The use of such ratios with the column dimensions normally employed was previously considered undesirable because of the belief that small, uniformly packed particles were required for good plate efficiency. Since present-day measuring techniques for plate height still involve appreciable experimental error, except when extreme precautions are taken, and since measurements on fragile particles such as firebrick may tend to include a range of mixed mesh sizes due to attrition of the particles during packing, it is probably that, in most cases, significant benefits of the type described will be found only with tube-to-particle diameter ratios of 5 or less or, conversely, with particle-to-column diameter ratios of ⅕ or greater.

Note, in FIG. 8, that the figure of merit $B_o/H^2_{min}$ goes to a distinct maximum or peak at a value of $D/d$ between 3 and 2 and then diminishes rapidly at lower values of $D/d$, since the permeability must, obviously, go to zero when the particle diameter equals the tube diameter (i.e., where $D/d$ equals 1). However, it will also be noted that the improved performance associated with large particle-to-tube diameter ratio is observed almost up to the limiting particle-to-tube diameter ratio of unity.

It will be understood that, while the column shown in FIG. 2 is of the gas-solid type, in which the packing particles themselves comprise the sorptive material, the present invention is also applicable to gas-liquid type chromatographic columns. That is, the same general principles apply with regard to particle size and the tube diameter in gas-liquid chromatography with the particles providing support for a thin layer of partitioning liquid which causes the separation as the gas mixture flows thereover.

It will also be understood that the column of the present invention is also applicable to liquid-solid type chromatograph columns in which a liquid solution is used as the carrier fluid and the packing particles comprise the sorptive material and to liquid-liquid type columns in which the packing particles provide support for a strongly adherent layer of partioning liquid which causes a separation of the liquid sample carried in a liquid carrier solution. In the case of liquid chromatograph columns, it is found that the inner dimension of the tube or column, according to the invention, may be as large as 2 mm. in diameter. In general, however, an inner diameter of 1 mm. will suffice, contrasting with the diameter of 0.25 mm. or smaller which is preferably the dimension of columns of this construction as employed in gas chromatography. In both gas and liquid type columns, the diameter of the patricles employed to pack the columns are from ⅕ to ½ of the inner diameter of the column and the quantity and volume of the particles packed therein are such that they produce an inner-particle void space of at least 45 percent of the total packed volume of the column.

In order to manufacture a small diameter column, in accordance with the concepts of the present invention, it is found advantageous to utilize a tube made from a deformable material and having an initial inner diameter substantially larger than the final inner diameter of the column that is to be manufactured therefrom. The tube is filled with particles having a diameter greater than ⅕ of the inner diameter of the column ultimately to be formed. As shown schematically in FIG. 4, the column 22a may then be drawn down through a suitable die 26 to the desired diameter, with the particles 24a therein.

While the use of a die is shown in FIG. 4, it is well known that glass tubing may be drawn down without a die to a very small diameter. For example, a glass tube having an inner diameter somewhat larger than 2 mm. was loosely packed with particles ranging between .1 and .15 mm. and drawn out to a length wherein the inner diameter was reduced to .3 mm. This column is illustrated in greatly magnified cross-section in FIG. 5. The particles 24b within the resulting elongated tubing 22b have arranged themselves, in the drawing out process, into groups or clusters of several particles separated by relatively short gaps or open spaces 23 in turn connected by narrow channels or passages (illustrated by the arrows in FIG. 5) around the particles. As may be seen in FIG. 5, the length of the open spaces or gaps between adjacent clusters of particles is between 1 to 5 times the cross-sectional dimension of the particles. The open regions or gaps 23 have no deleterious effect on the column performance. Because of the size of the particles, all of the open spaces or gaps are actually in the fluid stream and there are no side dead volumes where the sample may "hang up" or spread. When used in gas chromatograph type analyses, the spaces 23 and passages of the column effect a continual compression and dilitation of the gas stream and it is believed that this particle structure aids rather than hinders the mass transfer between the gas and the absorbent particles. In drawing out glass columns the sidewalls of the columns become somewhat softened and a few of the particles slightly imbed themselves in the wall of the column. This actually lends support to the packing structure within the glass column with the imbedded particles supporting those particles loosely retained within the column.

However, the invention is not limited to tubes of glass, but may also be applied to other tubes such as copper, stainless steel, aluminum or other metal tubes that may be drawn down to smaller diameters. There are also plastic materials that can be deformed at room temperatures or only slightly above room temperature and these offer special advantages when the filling material cannot be heated.

In the construction of small diameter columns, such as those having an inner diameter less than 1 mm., where the column is formed by drawing the column down from a larger diameter, it is sometimes desirable to pack the particles as loosely as possible to prevent the particles from binding during the drawing out process. In practice, such a loose packing may be accomplished merely by loosely filling (without agitation or knocking) the larger size tube (2 to 4 mm.) with relatively large size particles, i.e., with particles having a diameter at least ⅕ of the diameter of the column ultimately to be formed. Another means for obtaining a looser filling is shown in FIGS. 6 and 7, wherein a rod or wire 28 is first inserted into the tube 22c prior to filling the tube with particles 24c. The wire 28 is extracted from the tube 22c while the tube is in the horizontal position, leaving an unpacked space having the dimensions of the rod or wire for the length of the tube. The extra volume of the rod produces a loosely packed column that is still substantially evenly packed throughout the length of the column. This extra space prevents binding of the particles when the tube 22c is drawn to its desired size.

Columns to be employed for liquid chromatography are formed in substantially the same manner as the columns used for gas chromatography, with the exception that the maximum inner diameter of the liquid chromatograph column in its completed form is preferably somewhat larger than those columns to be employed for gas chromatography.

While in accordance with the Patent Statutes there has been described what at present are considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. A chromatographic column for the separation of the components of a mixture of gases, liquids or vapors flowing therethrough comprising:
    a tubular chromatographic column, and
    a packing of granular partitioning material within the interior volume of said column, said individual grains of said partitioning material supporting each other across the cross-section of said column and having sufficient size to create in a packing thereof a resultant inter-particle void space of at least 45 percent of the total packed volume of said column.

2. A chromatograph column for the separation of the components of a mixture of gases, liquids or vapors flowing therethrough comprising:
 a tubular chromatographic column,
 a packing of granular material within the interior volume of said column, said individual grains of said packing material supporting each other across the cross-section of said column and having sufficient size to create in a packing thereof, a resultant interparticle void space of at least 45 percent of the total packed volume of said column, and
 a partitioning liquid coated on the surface of said granular particles for separating components of a gas stream flowing through said void space around said particles.

3. A chromatographic column for the separation of the components of a mixture of gases, liquids or vapors flowing therethrough comprising:
 a tubular chromatographic column, and
 granular partitioning material packed within the interior volume of said column, said individual grains of said partitioning material supporting each other across the cross-section of said column and having a dimension greater than 1/5 of the inner diameter of said column.

4. A chromatographic column for the separation of the components of a mixture of gases or vapors flowing therethrough comprising:
 a tubular chromatographic column having an inner diameter less than 1 mm., and
 granular partitioning material packed within the interior volume of said column, said individual grains of said partitioning material supporting each other across the cross-section of said column and having a dimension larger than 1/5 of the inner diameter of said column.

5. A chromatographic column for the separation of the components of a mixture of gases or vapors flowing therethrough comprising:
 a tubular chromatographic column having an inner diameter less than 1 mm.,
 a granular support material packed within the interior volume of said column, said individual grains of said support material supporting each other across the cross-section of said column and having sufficient size to create in a packing thereof a resultant interparticle void space of at least 45 percent of the total packed volume of said column, and
 a partitioning liquid coated on the surface of said granular particles for separating components of a gas stream flowing through said void space around said particles.

6. A chromatographic column for the separation of the components of a mixture of gases or vapors flowing therethrough comprising:
 a tubular chromatographic column having an inner diameter less than 1 mm., and
 granular partitioning material packed within said inner volume of said column, said individual grains of said partitioning material supporting each other across the cross-section of said column and having a dimension larger than 1/5 of the inner diameter of said column, the total volume of said solid granular material comprising less than 55 percent of the inner volume of the packed portion of said column.

7. A chromatographic column for the separation of the components of a mixture of gases, liquids or vapors flowing therethrough comprising:
 a tubular chromatographic column, and
 a packing of granular material within said column, the individual grains of said packing material having a cross-sectional dimension greater than 1/5 of the inner diameter of said column, said packing being arranged within said column in small clusters of grains of packing material extending across said column separated by short spaces therebetween.

8. A chromatographic column for the separation of the components of a mixture of gases, liquids or vapors flowing therethrough comprising:
 a tubular chromatographic column, and
 granular partitioning material packed within said inner volume of said column, said individual grains of said partitioning material supporting each other across the cross-section of said column and having a dimension larger than 1/5 of the inner diameter of said column, some of said granular particles being imbedded into the side wall of said column and supporting the remaining particles loosely retained within said column.

9. A chromatographic column for the separation of the components of a mixture of liquid constituents comprising:
 a tubular chromatographic column having an interior diameter not greater than 2 mm., and
 granular partitioning material packed within the interior volume of said column, said individual grains of said partitioning material supporting each other across the cross-section of said column and having a dimension larger than 1/5 of the inner diameter of said column.

References Cited by the Examiner

UNITED STATES PATENTS

| 343,369 | 6/1886 | Haffcke | 55—387 X |
|---|---|---|---|
| 1,654,925 | 1/1928 | Dragler | 55—387 X |
| 2,325,061 | 7/1943 | Kaufman | 55—388 X |
| 3,005,514 | 10/1961 | Cole et al. | 55—386 |
| 3,050,920 | 8/1962 | Norton. | |
| 3,170,969 | 2/1965 | Lerner et al. | 55—524 X |
| 3,182,394 | 5/1965 | Jentzsch | 55—386 X |

REUBEN FRIEDMAN, *Primary Examiner.*

C. N. HART, *Assistant Examiner.*